United States Patent
Beausoleil et al.

(10) Patent No.: US 10,122,665 B2
(45) Date of Patent: Nov. 6, 2018

(54) DISTRIBUTED SYNCHRONIZATION DATA IN A MESSAGE MANAGEMENT SERVICE

(71) Applicant: Dropbox, Inc., San Francisco, CA (US)

(72) Inventors: Sean Beausoleil, Mountain View, CA (US); Steven Kabbes, Mountain View, CA (US); Michael Roeder, Oakland, CA (US)

(73) Assignee: DROPBOX, INC., San Francisco, CA (US)

( * ) Notice: Subject to any disclaimer, the term of this patent is extended or adjusted under 35 U.S.C. 154(b) by 66 days.

(21) Appl. No.: 14/199,907

(22) Filed: Mar. 6, 2014

(65) Prior Publication Data
US 2015/0256504 A1 Sep. 10, 2015

(51) Int. Cl.
*G06F 15/16* (2006.01)
*H04L 12/58* (2006.01)

(52) U.S. Cl.
CPC .................................. *H04L 51/22* (2013.01)

(58) Field of Classification Search
CPC ........................................................ H04L 51/34
USPC ........................................................ 709/206
See application file for complete search history.

(56) References Cited

U.S. PATENT DOCUMENTS

| | | | |
|---|---|---|---|
| 6,535,892 B1 * | 3/2003 | LaRue | G06F 17/30575 |
| 6,711,609 B2 | 3/2004 | Boyer | |
| 6,983,308 B1 * | 1/2006 | Oberhaus | H04L 51/14 |
| | | | 709/206 |
| 7,899,917 B2 | 3/2011 | Chitre | |
| 8,225,000 B2 | 7/2012 | Xu | |
| 2005/0086306 A1 * | 4/2005 | Lemke | H04L 47/2433 |
| | | | 709/206 |
| 2008/0189439 A1 * | 8/2008 | Chitre | H04L 67/1095 |
| | | | 709/248 |
| 2009/0157831 A1 | 6/2009 | Tian | |
| 2013/0282658 A1 * | 10/2013 | Besen | G06F 17/30215 |
| | | | 707/634 |

* cited by examiner

*Primary Examiner* — Suraj M Joshi
*Assistant Examiner* — Jaren Means
(74) *Attorney, Agent, or Firm* — DLA Piper LLP US

(57) ABSTRACT

A message management service that acts as intermediary between a messaging service and a client device can generate a synchronization data bundle for a message that includes an external message identifier usable to retrieve the message from the messaging service. The message management service can send the synchronization data bundle to the client along with the message, and the client can store the synchronization data bundle for each message in its local data store. The client can later return the synchronization data bundle to the message management service, which can use information contained therein to facilitate synchronization and related operations.

18 Claims, 10 Drawing Sheets

DISTRIBUTED SYNCHRONIZATION DATA IN A MESSAGE MANAGEMENT SERVICE

BACKGROUND

The present disclosure relates generally to message management services that act as intermediaries between messaging services and client devices, and in particular to message management services with distributed synchronization data across the client devices.

Individuals are becoming increasingly reliant on electronic messaging services, such as email services, instant messaging services, SMS/MMS (also referred to as text-messaging) services, and so on. Such services allow users to send and receive messages. In some instances, the services may also provide additional features related to managing messages, such as the ability to store or archive messages in folders, delete messages, search stored messages, and so on.

Many users who rely on electronic messaging services carry mobile devices, such as smart phones and tablets, that are capable of connecting to various data networks and acting as clients of an electronic messaging service. For example, a client device can receive messages from one or more services and can provide a user interface that allows the user to interact with messages, e.g., by replying to messages, deleting messages, archiving messages, composing new messages to be sent, etc. When connected to a data network, the client device can communicate updates from the messaging service to the user and can communicate instructions to the messaging service to implement user actions.

A client device's connection to a messaging service can be intermittent. For example, a user may power off the client device (or its RF transceivers) in various circumstances, or the transceivers may be on but unable to connect to a data network. Depending on how the client device is configured, the user may be able to interact with locally stored copies of messages while the client device is not connected to the messaging service. This can lead to loss of synchronization between the client and the messaging service, such that the state of the messages on the client device no longer matches the state of the messages at the messaging service with which the client communicates.

SUMMARY

To maintain or restore consistent state between a client device and a messaging service, it can be useful to perform synchronization operations. Such operations can include updating the state of the client device to match the messaging service and/or updating the state of the messaging service to match the client device. Synchronization can be further complicated in environments where a client device interacts with a message management service that acts as an intermediary between the client device and a messaging service. In this case, the message management service can store a subset of the user's messages (also referred to herein as a "window"), rather than all of them, and a copy of the server's window can be delivered to the client. If the message management service maintains a persistent connection to the messaging service, even when the client device is offline, the message management service can update its window such that its window diverges from the subset of messages, or window, stored on the client's device.

Certain embodiments of the present invention can facilitate synchronization in this context. For example, the message management service can generate a synchronization data bundle for a message that includes an external message identifier usable to retrieve the message from the messaging service. The message management service can send the synchronization data bundle for a message to the client along with the message, and the client can store the synchronization data bundle for each message in its local data store. In some embodiments, the client can send the synchronization data bundle for a particular message back to the message management service along with any request to act on that message (e.g., marking the message as read, moving the message to a different folder, deleting the message). The message management service can use the synchronization data bundle to find the message in its window or to obtain the message from the messaging service using the external message identifier in the synchronization data bundle. In some embodiments, the message management service can fully re-create the state of the client's window in its own window, e.g., by obtaining the synchronization data bundle for every message currently in the client's window, then obtaining any missing messages from the messaging service using the external message identifiers contained in the synchronization data bundle.

Certain embodiments of the present invention relate to computer-implemented methods that can be performed, e.g., by a server of a message management service that acts as an intermediary between the client device and a messaging service. The server can send to the client device a set of messages and a synchronization data bundle corresponding to each message in the set of messages, and the server can store the set of messages in a server message window. The server can update the server message window, e.g., by removing a message from the window, and in some instances the removal can occur while the client is offline. For instance, the server might receive a new message from the messaging service and remove an older message from the server message window in favor of the new message.

Subsequently, the server can receive a request from the client device to perform an action on the message that was removed; this request can include the synchronization data bundle corresponding to the message. Using information from the synchronization data bundle, the server can perform the requested action. For example, the synchronization data bundle can include an external message identifier that was assigned to the message by the messaging service. The server can use the external message identifier from the synchronization data bundle to request the message from the messaging service or to instruct the messaging service to update the message, e.g., by moving it to a new folder, updating message metadata (e.g., whether the message is read or unread), deleting the message, or the like.

In some embodiments, the server can identify a message (such as the new message mentioned above) that is present in the server message window but not present on the client device. If the client is connected to the server, the server can send the missing message and a corresponding synchronization data bundle to the client device. Conversely, the server can identify a message that is present on the client device but not present in the server message window and can instruct the client to remove this message, e.g., during a synchronization operation that reconciles the content of the server message window with a window of messages stored on the client device.

Certain embodiments of the present invention relate to computer systems. For example, a server computer system can provide a client interface configured to communicate with client devices; a messaging service interface configured to communicate with a messaging service; a message store configured to store a window of messages for various client devices; and a message management module coupled to the client interface, the messaging service interface, and the message store. In operation, the message management module can receive a message for one of the client devices from the messaging service interface and add the message to the window of messages stored for that client device in the message store. The message management module can send the message and a synchronization data bundle corresponding to the message to the client device (e.g., via the client interface). The synchronization data bundle can include an external message identifier assigned to the message by the messaging service. Later, the message management module can receive a request from the client device to perform an action on the message, and this request can include the synchronization data bundle for the message. If the message is present in the window of messages stored for the client device when the request is received, the message management module can use information stored in the window of messages to perform the requested action on the message. If the message is absent from the window of messages, the server can use information from the synchronization data bundle to perform the requested action on the message.

In some embodiments, the computer system can include various processing modules (which can be, e.g., processors executing specific program code), such as a sync data generator configured to create a synchronization data bundle corresponding to a given message and a sync data parser configured to extract one or more information items from a synchronization data bundle received from the client device.

In some embodiments, a synchronization data bundle can include information other than an external message identifier. For example, a synchronization data bundle can also include an internal message identifier assigned to the corresponding message by the message management service, an internal thread identifier assigned by the message management service to a group or thread of messages to which the corresponding message belongs, an external thread or folder or other message-group identifier assigned to the corresponding message by the messaging service, and/or status metadata indicating a status of the corresponding message when the synchronization data bundle was created (e.g., read or unread, folder location, tags or flags applied to the message, whether the user has responded by replying or forwarding the message, etc.).

The following detailed description together with the accompanying drawings will provide a better understanding of the nature and advantages of the present invention.

BRIEF DESCRIPTION OF THE DRAWINGS

FIG. 3A shows an example of a synchronized state of a server message window and a client message window; FIG. 3B shows an example of a scenario in which synchronization between the server message window and the client message window can be lost. FIG. 3C shows an example of a scenario that can occur subsequently to the scenario of FIG. 3B. FIG. 3D shows an example of a scenario that can occur subsequently to the scenario of FIG. 3C. FIG. 3E shows an example of a fully resynchronized state following the events of FIGS. 3B and 3C.

DETAILED DESCRIPTION

Certain embodiments of the present invention can facilitate synchronization between a message management service and a client device. For example, the message management service can generate a synchronization data bundle for a message that includes an external message identifier usable to retrieve the message from the messaging service. The message management service can send the synchronization data bundle for a message to the client along with the message, and the client can store the synchronization data bundle for each message in its local data store. In some embodiments, the client can send the synchronization data bundle for a particular message back to the message management service along with any request to act on that message (e.g., marking the message as read, moving the message to a different folder, deleting the message). The message management service can use the synchronization data bundle to find the message in its window or to obtain the message from the messaging service using the external message identifier in the synchronization data bundle. In some embodiments, the message management service can fully re-create the state of the client's window in its own window, e.g., by obtaining the synchronization data bundle for every message currently in the client's window, then obtaining any missing messages from the messaging service using the external message identifiers contained in the synchronization data bundle.

Figure 1:
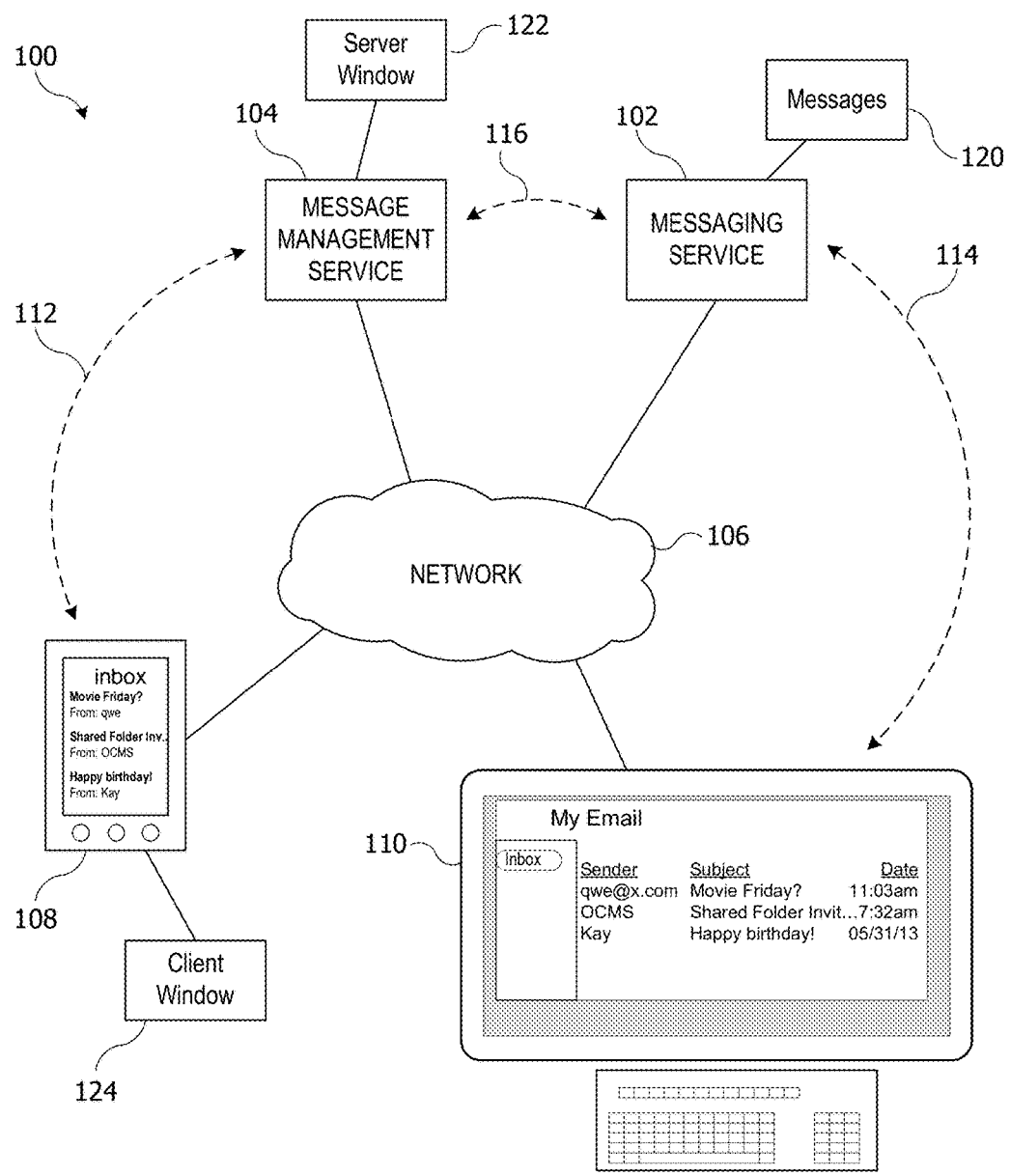
FIG. 1 shows a block diagram of a communication system according to an embodiment of the present invention.

FIG. 1 shows a block diagram of a communication system 100 according to an embodiment of the present invention. Communication system 100 can include a messaging service 102 and a message management service 104 connected to a network 106. Also connected to network 106 can be various clients 108, 110 that can be used to access messaging service 102 and/or message management service 104. In this example, client 108 accesses message management service 104 (as indicated by dashed arrow 112) while client 110 accesses messaging service 102 (as indicated by dashed arrow 114). It is to be understood that access can be indirect, e.g., via network 106.

Messaging service 102 can be any service that allows users to send, receive, store, and/or access messages, where a "message" can include any electronic communication generated by a sender and directed to one or more recipients, such as email messages, instant messages (e.g., messages sent between users using various "chat" services), SMS/ MMS messages (e.g., messages conforming to Short Messaging Service and/or Multimedia Messaging Service protocols supported by various cellular and other wireless data networks), voice messages, photo/image messages, social network messages, and so on. Examples of messaging service 102 can include email services such as Gmail™ (a service of Google Inc.) and Yahoo! ® Mail (a service of Yahoo! Inc.). Other examples can include instant messaging or chat services such as Gmail's chat feature or the Facebook® chat function (a service of Facebook, Inc.), SMS/MMS services provided by cellular data carriers, social network services with a messaging component (e.g., social networks provided by Facebook, Inc., or LinkedIn Corp.), and so on. In some embodiments, a user can establish an account with messaging service 102, and messaging service 102 can store and provide access to the user's messages 120. Messaging service 102 can also provide web-based client interfaces, dedicated application programs, application program interfaces (APIs), and/or other tools for facilitating user access to messages 120.

Message management service 104 can be a service that acts as a proxy or intermediary between messaging service 102 and a client 108, as indicated by dashed arrow 116. Message management service 104 can provide enhanced functionality for organizing, storing, accessing, composing, and/or responding to messages 120 stored by messaging service 102. One example of message management service 104 can be the Mailbox service of Dropbox, Inc.

Clients 108 and 110 can be user-operated computing devices that can execute software to interact with message management service 104 and/or messaging service 102. Various types of computing devices can be used, including desktop computers, laptop computers, tablet computers, smart phones, wearable computing devices, personal digital assistants, and so on. By way of example, client 108 can be a smart phone that can execute an application program (also referred to as an app) to communicate with message management service 104 via network 106. The app can be provided by a provider of message management service 104 and can be customized to allow access to enhanced message management functions supported by message management service 104.

Client 110 can be a desktop computer that can execute an app to communicate with messaging service 102 without using message management service 104. This app can be, for example, a mail client app built into an operating system of a desktop computer, a web browser that interfaces with a web-based messaging service, a service-specific application provided by the provider of messaging service 102, or another app. Client 110 in examples described herein does not access message management service 104 and might or might not provide user input controls for enhanced functionality.

A given user can have accounts with both messaging service 102 and message management service 104. The user's account with message management service 104 can be linked to the user's account with messaging service 102, allowing the user to use message management service 104 to manage messages 120 sent and received via messaging service 102. In some embodiments, a user can have multiple accounts with one or more messaging services 102 and can link any or all of these accounts to a single account with message management service 104.

To reduce the storage demand on message management service 104 and client 108, messaging service 102 can be used as a "master" repository of messages 120 for a given user's account. Message management service 108 can select a subset of messages 120 (e.g., the 50 or 100 messages that were most recently received or most recently acted upon by the user) for delivery to client 108. Message management service 108 can store the selected subset of messages 120 as a "server window" (or "server message window") 122 and can propagate some or all of the messages from server window 122 to client device 108, which can store the messages in its own "client window" (or "client message window") 124.

In some embodiments, client 108 might not be continuously connected to message management service 104. For example, client 108 can be a mobile device that may, from time to time, enter an area where access to network 106 is unavailable. As another example, a user may power off client 108 or its data transceiver(s), or the user may terminate an application executing on client 108 that communicates with message management service 104. Any of these events can result in disconnection between client 108 and message management service 104; depending on various circumstances, client 108 can remain disconnected (also referred to as "offline") for milliseconds, seconds, minutes, hours, or longer. In some instances, while client 108 is offline, a user can interact with client 108 (or an application executing thereon) to view and update messages received from message management service 104 that have been stored in client window 124 on client 108. For example, a user can read messages, compose replies to messages, mark messages for deletion or moving to other folders, and so on. As described below, if a user interacts with messages while client 108 is offline, client 108 can queue action requests (also referred to as updates) for later delivery to message management service 104.

In some embodiments, message management service 104 can maintain a persistent connection 116 to messaging service 102, regardless of whether client 108 is offline or online (i.e., in communication with message management service 104) at a given time. Via persistent connection 116, message management service 104 can receive updates to the user's messages from messaging service 102. For example, if messaging service 102 receives a new message for an account linked to message management service 104, message management service 104 can obtain the new email and add it to server window 122, regardless of whether client 108 is online. As another example, if messaging service 102 receives an instruction (e.g., from client 110) to delete a message or move a message to another folder, messaging service 102 can provide the update to message management service 104, which can update server window 122 accordingly. If message management service 104 updates server window 122 while client 108 is online, message management service 104 can propagate the update to client 108, which can update client window 124. However, if client 108 is offline, updates cannot be immediately propagated.

Thus, it is possible for server window 122 and client window 124 to lose synchronization (or become out of sync) with each other. In various scenarios, server window 122 can contain messages that are not present in client window 124, and client window 124 can contain messages that are not present in server window 122.

To facilitate re-synchronization between server window 122 and client window 124, message management service 104 can distribute synchronization data to client 108. For example, when message management service 104 propagates a message to client 108, it can include a synchronization data bundle with the message. The synchronization data bundle for a message can include any information usable by message management service 104 to re-create the message in server window 122. In some embodiments, the synchronization data bundle can include an "external" message identifier that was assigned to the message by messaging service 102 and that is usable by message management service 104 to retrieve the message from message repository 120 of messaging service 102. At any time while client 108 is online, client 108 can provide some or all of the synchronization data bundles for messages in client window 124 to message management service 104, and message management service 104 can use the received synchronization data bundles to synchronize server window 122 with client window 124. Specific examples are described below.

It will be appreciated that system 100 is illustrative and that variations and modifications are possible. Embodiments of the present invention can support any number of client devices, including client devices belonging to or otherwise associated with different users. Further, in some embodiments, a message management service can interact with multiple messaging services and can manage messages of disparate types (e.g., email and social network messages).

Figure 2:
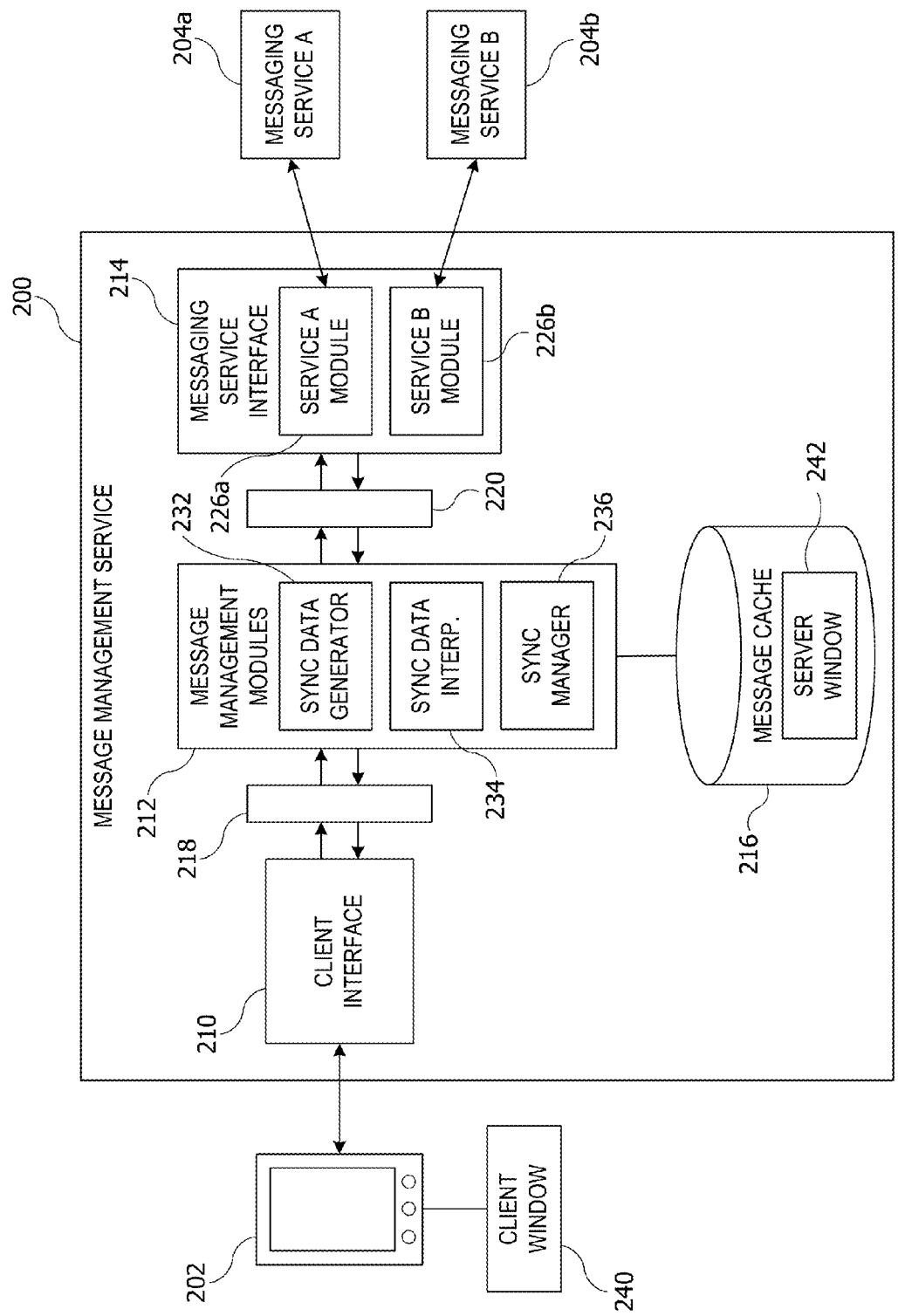
FIG. 2 shows a block diagram of a message management service according to an embodiment of the present invention.

FIG. 2 shows a block diagram of a message management service 200 according to an embodiment of the present invention. Message management service 200 can implement message management service 104 of FIG. 1. For example, message management service 200 can act as an intermediary between a client 202 (e.g., implementing client 108 of FIG. 1) and various messaging services 204a, 204b (e.g., implementing messaging service 102) of FIG. 1. Each service 204a, 204b can be a different messaging service, such as different email services, an email service and a social network service, and so on. While two messaging services 204 are shown, any number of messaging services 204 can be supported by a single message management service 200.

Message management service 200 can include a client interface 210, message management modules 212, a messaging service interface 214, and a message cache 216. A client transfer layer 218 can provide transfer queues for transferring messages and other instructions and information between client interface 202 and message management modules 212, and a service transfer layer 220 can provide transfer queues for transferring messages and other instructions and information between message management modules 212 and messaging service interface 214.

Client interface 210 can communicate with multiple instances of client 202 (e.g., clients associated with different users and/or multiple clients associated with the same user). For instance, client interface 210 can deliver "inbound" messages from messaging services 204a, 204b to client 202, receive "outbound" messages from client 202, and/or receive various message processing instructions from client 202, such as instructions to defer a message.

Message management modules 212 can include functional blocks or modules configured to perform various operations on messages received by message management service 200, including outbound messages received from client 202 as well as inbound messages received from messaging services 204a, 204b. For example, message management modules 212 can include sync data generator 232, sync data parser 234, and sync manager 236.

Sync data generator 232 can create a synchronization data bundle for an inbound message received from messaging service interface 214. The synchronization data bundle for a message can include an "external" message identifier assigned to the message by messaging service 204, an "internal" message identifier assigned to the message by message management service 200, and/or other information as desired. Specific examples are described below. Sync data generator 232 can provide the synchronization data bundle for an inbound message to client interface 210 so that client interface 210 can transmit the synchronization data bundle together with the message to client 202.

Sync data parser 234 can receive a synchronization data bundle associated with an outbound message or message update request (also referred to herein as an action request) received from client interface 210. Sync data parser 234 can extract information items, such as the external message identifier and/or the internal message identifier from the synchronization data bundle and can provide the message identifiers and/or other information items extracted from the synchronization data bundle to consumers such as sync manager 236 and/or messaging service interface 214.

Sync manager 236 can manage various synchronization operations to synchronize a message store of client 202 (e.g., client window 240) with a local message store (e.g., a server window 242 maintained in message cache 216. For example, upon receipt of a message update request via client interface 210, sync manager 236 can invoke sync data parser 234 to extract the internal and/or external message identifiers (IDs) from the synchronization data bundle included with the request. Using the internal and/or external message IDs, sync manager 236 can determine whether the message is present in message cache 216. If not, sync manager 236 can include the external message ID in a request to messaging service interface 214 to retrieve the message from the appropriate messaging service 204. As another example, when client 202 reconnects after being offline, sync manager 236 can execute a complete synchronization operation using synchronization data bundles provided by client 202. Specific examples of operations that can be performed by sync manager 236 are described below.

Messaging service interface 214 can include various service modules 226a, 226b, each of which can be configured to communicate with a different one of messaging services 204a, 204b. For example, different messaging services 204 may support different communication protocols for access by external clients (e.g., IMAP, POP, MAPI/Exchange, custom APIs, and so on), and each service module 226 can be configured to use the appropriate protocol for a particular messaging service 204.

In some embodiments, messaging service interface 214 can present itself to messaging services 204a, 204b as a client accessing functionality of messaging services 204a, 204b, so that the existence of message management service 200 can be transparent to messaging services 204a, 204b. For example, if messaging service 204a supports IMAP, service module 226a can establish a persistent IMAP connection to a user's account with messaging service 204a, allowing messaging service 204a to deliver any incoming messages or message updates it receives for the user's account to message management service 200. Similarly, message management service 200 can deliver any outbound messages or message updates it receives from client device 200 to messaging service 204a. Persistent connections to services other than IMAP can also be maintained, or messaging service interface 214 can periodically poll various messaging services 204 to obtain new messages. The persistent connection can be maintained regardless of whether a given user currently has any client 202 connected to client interface 210, and message management service 200 can maintain synchronization with messaging services 204.

Message cache 216 can be a database or other data store managed by message management service 200 that provides storage and retrieval of messages. For example, messages can be stored and retrieved by reference to internal message identifiers assigned to each message by message management service 200 and/or messaging services 204. Message management service 200 can use message cache 216 to store copies of messages that are likely to be of interest to a client, such as recently received messages or messages found in a user-initiated search.

Messaging services 204 can maintain their own message stores or repositories independently of any action by message management service 200. In some embodiments, messaging service 204 can maintain a primary (or "master") store of messages for a user that can include all messages currently associated with that user's account (e.g., including sent messages, received messages, archived messages, etc.), and message cache 216 can store a subset of the user's messages (e.g., in server window 242) as well as partial information about additional messages in the primary store that are not currently replicated in server window 242. If client 202 requests a message that is not presently stored in message cache 216, message management service 200 can retrieve the message from the appropriate messaging service 204 and deliver it to client 202.

In operation, message management service 200 can obtain inbound messages from messaging services 204 and provide the messages to client 202. Message management service 200 can also receive outbound messages (e.g., messages to be sent) from client 202 and provide the messages to messaging service 204 for delivery to the recipient(s). Message management service 200 can also receive message update requests (also referred to as action requests) from client 202 and can provide corresponding instructions to messaging service 204, e.g., to mark messages as read or unread, move a message to a folder, apply or remove a message tag, delete a message, and so on. Message management modules 212 can perform various operations on inbound and/or outbound messages, examples of which are described below.

It will be appreciated that message management service 200 is illustrative and that variations and modifications are possible. For example, other message management modules and/or operations can be provided, such as the ability to defer messages for later review and/or response, tag messages, search messages, and so on. In some embodiments, message management can include windowing (selecting and immediately delivering to a client a fixed number of messages deemed likely to be relevant, such as the 50 or 100 or some other number of most recent messages), backfilling (populating message cache 216 with messages in anticipation of client requests), message format conversion (e.g., converting between a message format used by a messaging service and a format optimized for display on a client), management of message folders or streams, message sorting, management of attachments, synchronization with messaging services 204 (e.g., relaying instructions from client 202 to move or modify messages) and so on.

In accordance with certain embodiments of the present invention, message management service 200 can distribute synchronization data bundles to client device 202 to help facilitate subsequent resynchronization of client window 240 with server window 242 and other operations. FIGS. 3A-3E show examples of the use of synchronization data bundles according to an embodiment of the present invention.

Figure 3A:
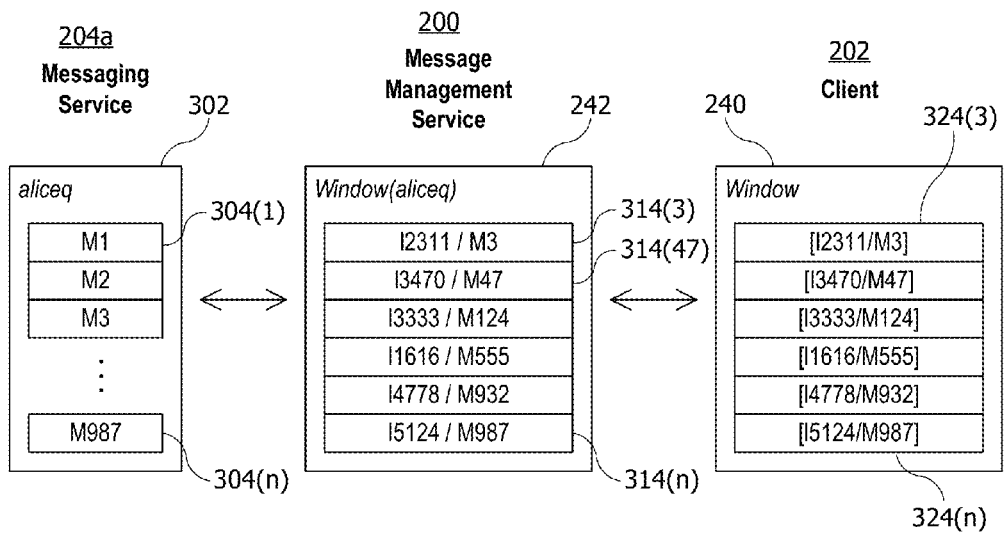
FIGS. 3A-3E show examples of the use of synchronization data bundles according to an embodiment of the present invention.

FIG. 3A shows an example of a synchronized state. Messaging service 204a can store a repository 302 of messages for a particular user account ("aliceq"). The repository in this example includes messages 304(1)-304(n). Each message 304(1)-304(n) can have message metadata, including an external message ID (shown as M1, M2, etc.), and message content (not shown). External message IDs M1, M2, etc., can be assigned by messaging service 204a, in any manner desired. It is assumed that external message IDs M1, M2, etc. are defined such that each message 304 in repository 302 for a given user account has a different external message ID; depending on the messaging service, messages in repositories for different user accounts might or might not have overlapping external message IDs.

Message management service 200 can maintain server window 242 of messages for the user account "aliceq." Server window 242 can store copies 314 of a subset of the messages 304 from repository 302, with the subset being selected by message management service 200. For example, message management service 200 can select messages 304 for inclusion in server window 242 based on criteria such as recency of receipt, recency of being read or acted upon by the user, indicia of relevance or importance (e.g., if the user has flagged the message as important or needing attention), or any other criteria. In some embodiments, in order to facilitate management of data storage requirements for message management service 204, server window 242 can be limited to containing a fixed number of messages 314, e.g., 50 or 100 messages. Depending on implementation, a given message 314(i) in server window 242 might or might not be identical to corresponding message 304(i) in messaging service repository 302. For example, message management service 200 can reformat messages, add or modify message metadata, or perform other operations as desired.

In this example, message management service 200 can assign to each message 314 in server window 306 an internal message identifier (shown as 12311, 13470, etc.). The internal message ID can be assigned according to a namespace or scheme defined by message management service 200 and can be independent of the external message ID (M1, M2, etc.) assigned by message service provider 204a.

When client 202 is online (i.e., in communication with message management service 200), message management service 200 can synchronize server window 242 with client window 240 maintained on client 202. Thus, as shown, client window 240 can store a copy 324 of each message 314 in server window 242. Each message 324 as stored in client window 240 can include a synchronization data bundle that, in this example, includes both the internal message ID (12311, etc.) assigned by message management service 200 and the external message ID (M1, M2, etc.) assigned by messaging service 204a. Depending on implementation, a given message 324(i) in client window 240 might or might not be identical to corresponding message 314(i) in server window 242. For example, client interface 210 (FIG. 2) can convert message 314 to a different format, or add or modify message metadata, to create message 324. In some embodiments, the synchronization data bundle generated by sync data generator 232 can be present in messages 324 but not in message 314 (although some or all of the information contained in the synchronization data bundle can be present in message 314).

Figure 3B:
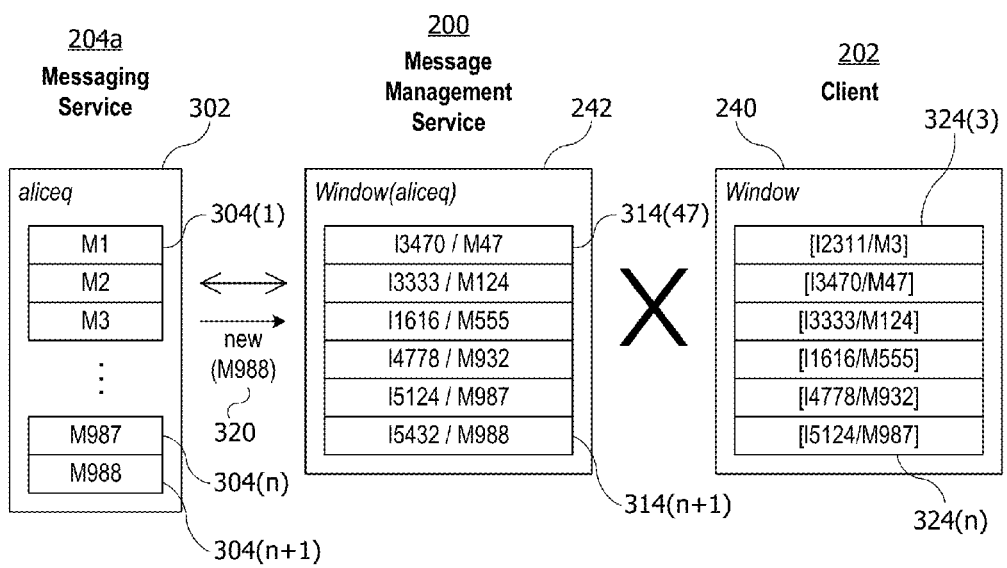

FIG. 3B shows an example of a scenario which synchronization between client 202 and message management service 200 can be lost. In this example, client 202 is offline (indicated by the "X"). While client 202 is offline, message management service 200 can receive a new message 304 (n+1) from messaging service 204a, as shown by event 320. In response, message management service 200 can add corresponding new message 314(n+1) to server window 242. Assuming that the size of server window 242 is already at its upper limit, a previously received message (e.g., message 314(3)) can be deleted from window 242 to make space for new message 314(n+1). Because client 202 is offline, the change is not propagated to client 202, and a mismatch is created between server window 242 and client window 240.

Figure 3C:
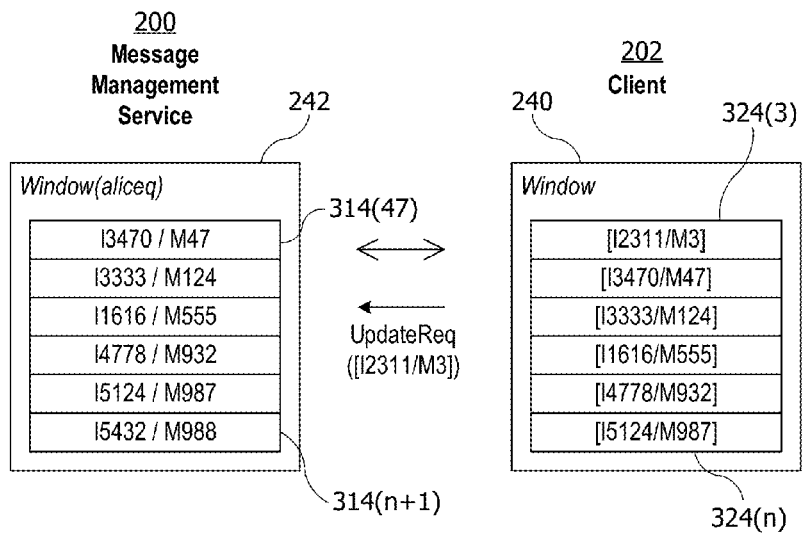

FIG. 3C shows an example of a scenario that can occur if client 202 comes back online (i.e., reconnects to message management service 200) subsequently to the scenario of FIG. 3B. In this example, while client 202 was offline, the user performed an action on message 324(3). For example, the user might have read message 324(3) (changing the message state from unread to read), moved message 324(3) to a new folder, deleted message 324(3), composed a reply to message 324(3), etc. When client 202 reconnects to message management service 200, client 202 can send update request 330 to message management service 200, indicating the action performed by the user. Update request 330 can include the synchronization data bundle for acted-upon message 324(3). In this example, message 314(3) corresponding to acted-upon message 324(3) is no longer present in server window 242.

Figure 3D:
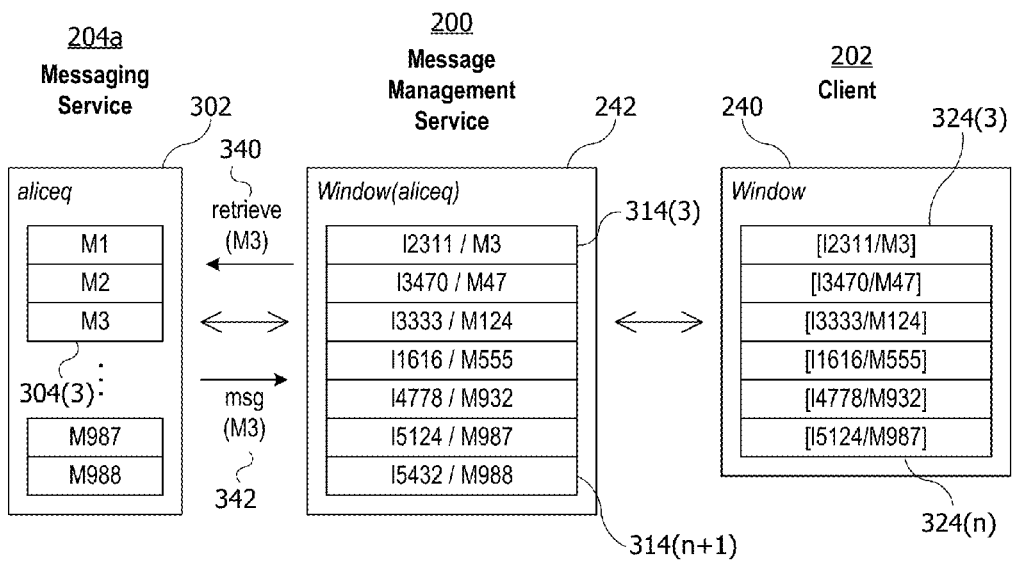

As shown in FIG. 3D, message management service 202 can use information from the synchronization data bundle in update request 330, in particular the external message ID (M3), to request message 304(3) from messaging service 204*a* (event 340). Based on the response from messaging service 204*a* (event 342), message management service 200 can restore message 314(3) to server window 242. In the embodiment shown, message management service 200 can temporarily allow server window 242 to exceed its nominal maximum size during a resynchronization operation, in order to accommodate the restoration of message 314(3); in other embodiments, message management service 202 can identify another message to remove from window 242 to accommodate the restoration of message 314(3). It should be noted that in some instances, message management service 202 might not need to restore message 314(3) in order to perform the requested update. For example, if the requested update is to delete message 324(3), message management service 202 can send a delete instruction to message management service 204*a* using the external message ID (M3) extracted from the synchronization data bundle received in request 330, and there may be no reason to retrieve the content of message 304(3) from messaging service 204*a*.

Figure 3E:
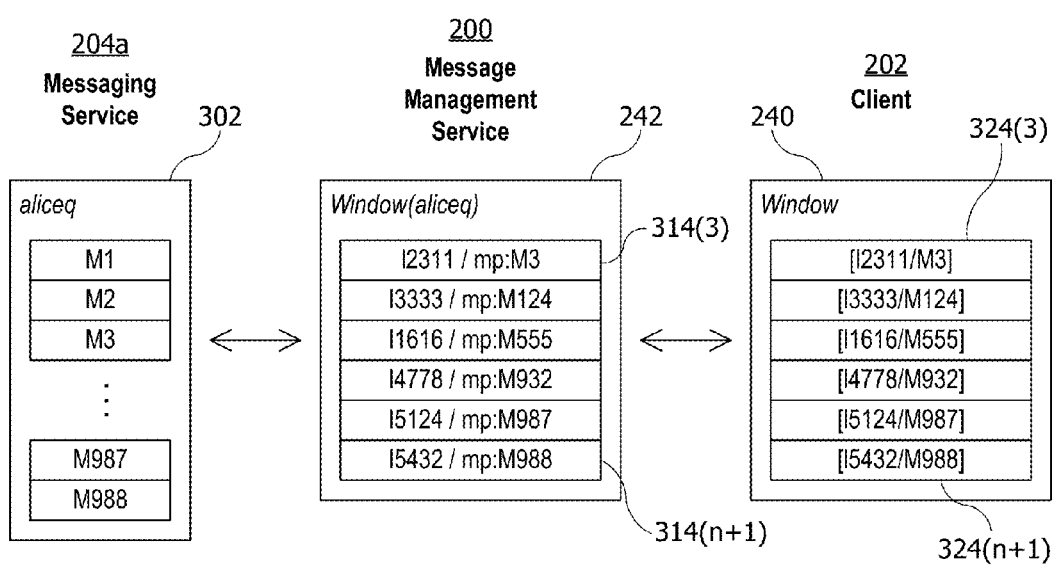

FIG. 3E shows an example of a fully resynchronized state following the events of FIGS. 3B and 3C. In this example, client 202 can send to message management service 200 the synchronization data bundle for each message 324 in client window 240. Message management service 200 can compare information items (e.g., internal message IDs) extracted from the synchronization data bundles to messages 314 in window 242 and can identify and resolve any discrepancies. For instance, if a message (e.g., message 324(3)) is present in client window 240 but not in server window 242, message management service 200 can use the external message ID in the synchronization data bundle to retrieve the message from messaging service 204*a*, as shown in FIG. 3D. If, after adding messages 314, server window 242 exceeds its nominal limit (as is the case in FIG. 3D), message management service 200 can identify one or more messages (e.g., message 314(47) in FIG. 3D) to be removed from server window 242 and can instruct client 202 to remove the message from client window 240 as part of establishing synchronization. In addition, if server window 242 contains a message (e.g., message 314(*n*+1) in FIG. 3D) that is not present in client window 240, message management service 200 can provide the missing message 324(*n*+1), together with a corresponding synchronization data bundle, to client 202. Thus, in FIG. 3E, server window 242 includes a message 314 corresponding to every message 324 in client window 240, and vice versa.

For a message management service with a large number of clients, distribution of synchronization data bundles to client devices can significantly reduce the storage requirements of the message management service, while adding only a small incremental storage requirement to each client that interacts with the message management service.

It will be appreciated that the messages, synchronization data bundle elements, and other features shown in FIGS. 3A-3E are illustrative and that variations and modifications are possible. A synchronization data bundle can have any format desired and can include any number and combination of information items, including an external message identifier (any identifier assigned to the message by the messaging service) and/or an internal message identifier (any identifier assigned to the message by the message management service), as well as other information items, examples of which are described below. The size of a server message window and/or a client message window can be selected as desired; while the examples shown use a small number of messages for ease of illustration, larger windows (e.g., 50 messages, 100 messages, 200 messages) are contemplated. In some embodiments, window size need not be limited at all, or the windows can be limited based on time constraints (e.g., purging messages that the user has not viewed in some time period such as two weeks or a month) rather than a specific number of messages or data size.

In some embodiments, client 202 does not need to read or parse a synchronization data bundle. Instead, client 202 can simply store the synchronization data bundle in association with each message 324 in client window 308. Client 202 can return the synchronization data bundle (e.g., exactly as received) to message management service 200, and all reading, parsing, and other processing of synchronization data bundles can be handled by message management service 200. Any information items from the synchronization data bundle that client 202 might need to access can be provided in message metadata fields separately from the synchronization data bundle; consequently, the synchronization data bundle can preserve information as to the state or status of a particular message 324(*i*) at the time message management service 200 sent message 324(*i*) to client 202. In some embodiments, client 202 can, if desired, read and use the synchronization data bundle for various purposes.

In some embodiments, message management service 200 does not need to keep any record of a message that has been removed (or deleted) from window 242 (e.g., message 314(3) in FIG. 3B). Instead, as described above, message management service 200 can use information from the synchronization data bundle provided by client 202 to retrieve corresponding message 304(3) from message management service 204*a* and recreate message 314(3) or to perform other operations requested by client 202. Thus, the burden of storing any data needed to reestablish a synchronized state with a given client 202 can be shifted from message management service 200 to that client 202. Detection of messages that are present in server window 242 but not client window 240 can be accomplished using various techniques. For example, if client 202 sends a complete set of synchronization data bundles corresponding to all messages 324 in client window 240, matching each received synchronization data bundle to a message 314 in server window 242 (e.g., by reference to internal message IDs) can reveal the existence of any messages 314 that are absent from client window 240 by process of elimination. Alternatively or additionally, in some embodiments, message management service 200 can store metadata for each message 314 in server window 242 indicating whether the message has been delivered to client 202, and this metadata record can be used to identify messages that are absent from client window 242.

In some embodiments, message management service 200 can store at least some information related to messages 314 that have been removed from window 242. For example, in some embodiments, message management modules 212 (FIG. 2) can include a module that groups messages 314 into threads. Data pertaining to the assignment of a message 314 to a thread can be stored persistently by reference to the internal message ID, regardless of whether message 314 is in server window 242 or not. Accordingly, in some embodiments, thread information can be stored by associating internal message IDs with internally-generated thread identifiers in a thread lookup table that is maintained separately from server window 242 and that is not affected by message removal from server window 242. If the synchronization data bundle includes the internal message ID, the stored thread information in the thread lookup table can be usable even for messages that have dropped out of window 242 and are subsequently restored.

Internal and external message IDs can be assigned in any manner desired, and the formats shown are illustrative and not limiting. An external message ID can include a message identifier, thread identifier, folder identifier, and/or any other information assigned to the message by messaging service 204a. For example, the Gmail service assigns each message a message identifier (X-GM-MSGID) and a thread identifier (X-GM-THRID), and both of these information items can be included in a synchronization data bundle by message management service 200. As another example, the Yahoo! Mail service and other IMAP services identify a message using a folder identifier (folderID) and a unique identifier (UID) within the folder. In such systems, copies of a message can exist in multiple folders, and the external message ID can include an array of (UID, folderID) pairs, one pair for each folder where a copy of the message is known to be stored. If the message is part of a thread, the synchronization data bundle can include an array of the external message IDs (each of which can itself be an array of (UID, folderID) pairs) of all the messages in the thread. Those skilled in the art with access to the present disclosure will appreciate that any external message ID recognized by a messaging service can be used in connection with synchronization data bundles as described herein. In embodiments where a message management service interacts with multiple messaging services, the synchronization data bundles can have a format that depends on the message's origin (e.g., which messaging service provided the message), and sync data parser 234 can be configured to parse multiple formats.

In addition, the synchronization data bundle can also include other information usable by message management service 202 to retrieve a message. For instance, in embodiments where message management service 202 can communicate with multiple messaging services 204a, 204b and/or multiple accounts for the same user on a given messaging service 204a or 204b, the synchronization data bundle for a message can include a service-provider identifier and/or account identifier for the message.

The internal message ID can be assigned by message management service 200 according to its own conventions. For example, the internal message ID can be formatted to facilitate internal operations of message management service 200. In some embodiments where message management service 200 groups messages into threads, the internal message ID can incorporate thread information (e.g., an internal thread identifier for a thread to which the message has been assigned) as well as individual message information.

As noted above, a synchronization data bundle can be but need not be readable by the client that receives it. In some embodiments, message management service 200 (e.g., using sync data generator 232 of FIG. 2) can encrypt or otherwise modify or conceal the contents of the synchronization data bundle so as to make it unreadable by other services, systems, or devices. Any type of encryption or modification can be used, provided that message management service 200 (e.g., using sync data parser 234 of FIG. 2) can reverse the encryption or modification and extract the information content from the synchronization data bundle.

Examples of processes for distributing synchronization data bundles from a message management service to a client and using synchronization data bundles to restore a synchronized state between the client and the message management service will now be described.

Figure 4:
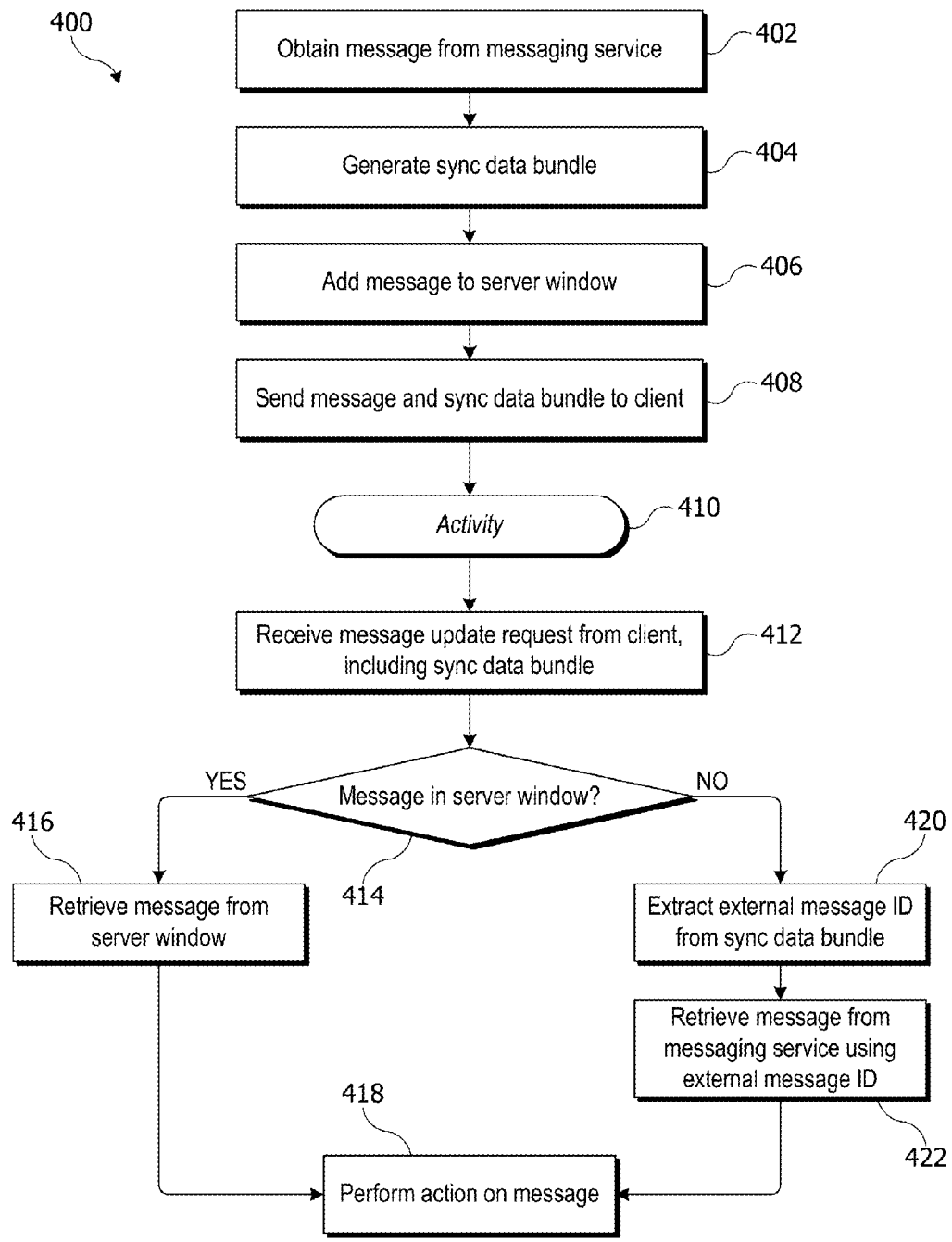
FIG. 4 shows a flow diagram of a process for a message management service interacting with a client device according to an embodiment of the present invention.

FIG. 4 shows a flow diagram of a process 400 for interacting with a client device (e.g., client 202 of FIG. 2) according to an embodiment of the present invention. Process 400 can be implemented, e.g., in message management service 200 of FIG. 2, e.g., using sync manager 236.

Process 400 can begin at any time when client 202 and message management service 200 are in communication with each other. For example, at block 402, message management service 200 can receive a message from messaging service 204a. This can be, for example, a new message that was recently received by messaging service 204a for a user account belonging to the user of client 202, a message responsive to a request from message management service 200 (e.g., a search query or request for messages in a particular folder or thread), or any other message that is to be added to server window 242.

At block 404, message management service 200 can generate a synchronization data bundle for the received message, e.g., using sync data generator 232. As described above, the synchronization data bundle can include an external message ID, an internal message ID, and/or other information. At block 406, message management service 200 can add the received message, including some or all of the synchronization data, to server window 242. At block 408, message management service 200 can send the message, including the synchronization data bundle, to client 202. In some embodiments, a synchronization data bundle is sent with each message to be added to client window 240.

At block 410, further activity can occur. In various embodiments, further activity at block 410 can include receiving additional messages and repeating blocks 402-408. Further activity at block 410 can also include receiving and acting on message update requests (also referred to herein as action requests) from client 202, such as marking a message as read, moving a message to a different folder, deleting a message, and so on. In some embodiments, client 202 might go offline at some point during block 410, in which case sending messages to client 202 (e.g., at block 408) may not be immediately possible.

Some time later (how much later is irrelevant for present purposes), at block 412, message management service 200 can receive a message update request from client 202 (e.g., as shown in FIG. 3C). The request can include a synchronization data bundle for the message to be updated. At block 414, message management service 200 can determine whether the message to be updated is present in server window 242. If so, then at block 416, message management service can retrieve the message from server window 242, and at block 418, the requested update can be performed. If, however, block 414 results in a determination that the message is not present in server window 242, then at block 420, message management service 200 can extract an external message ID from the synchronization data bundle received at block 412, and at block 422 message management service 200 can retrieve the message from the messaging service (e.g., messaging service 204a) using the external message ID. At block 418, message management service 200 can perform the requested update.

It will be appreciated that process 400 is illustrative and that variations and modifications are possible. Steps described as sequential may be executed in parallel, order of steps may be varied, and steps may be modified, combined, added or omitted. For instance, blocks 402-408 can be performed whenever an inbound message is received by message management service 200; if the client is not online, block 408 can be skipped or deferred. Similarly, blocks 412-422 can be performed whenever message management service 200 receives an action request, or message update request, from client 202.

In some instances, the action requested at block 412 can be performed without retrieving the message. For example, if the action is deleting the message, message management service 200 can simply send a delete instruction that includes the external message ID to messaging service 204a. Accordingly, message retrieval actions (blocks 416, 422) can be omitted in instances where the action can be performed without message management service 200 having or acquiring a copy of the message in server window 242.

Figure 5:
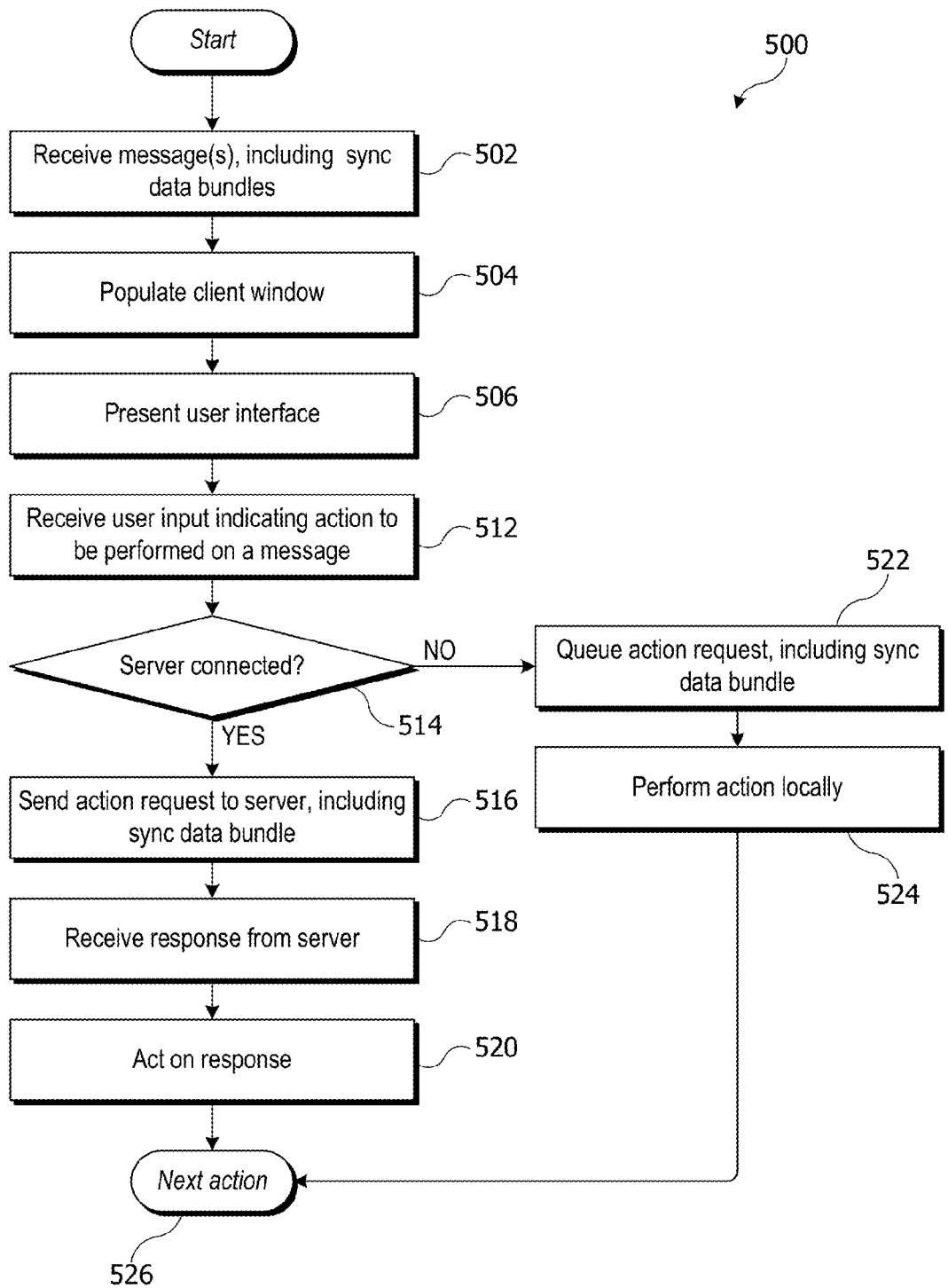
FIG. 5 shows a flow diagram of a process executing on a client device according to an embodiment of the present invention.

As noted, client 202 can generate message update requests (also referred to herein as "action requests") regardless of whether it is online or offline. FIG. 5 shows a flow diagram of a process 500 for generating action requests according to an embodiment of the present invention. Process 500 can be implemented in a client device (e.g., client 202 of FIG. 2) that interacts with a message management service (e.g., message management service 200) implementing process 400 of FIG. 4 or similar processes. In particular, as described above, client 202 can maintain client window 240 of messages received from message management service 200, and the stored information in window 240 can include a synchronization data bundle for each message in window 240.

Process 500 can begin when client 202 is connected to message management service 200 (i.e., "online") and executing a message-management application program that interacts with message management service 200 to facilitate management of a user's messages. The application program can provide a user interface to present information about messages (including message content and/or metadata) to the user and to accept and interpret user input as requests to act on messages.

At block 502, process 500 can receive, from message management service 200, one or more messages to be added to a message window (e.g., window 240) maintained by the client. A synchronization data bundle can be received for each message. At block 504, process 500 can populate client message window 240 with the received messages; populating window 240 can include storing the synchronization data bundle for each message. At block 506, process 500 can present a user interface that allows the user to view and act upon messages in window 240.

At block 512, process 500 can receive user input indicating an action to be performed on a message. The particular actions supported can be defined by the message-management application program and can include, for instance, replying to a message, forwarding a message, moving a message to a specified folder, deferring a message for later handling, deleting a message, and so on. At block 514, process 500 can determine whether client 202 is still online, e.g., whether client 202 remains in communication (or able to establish communication) with message management service 200. If so, then at block 516, process 500 can send an action request to message management service 200; the request can include the synchronization data bundle for the message that is to be acted upon. At block 518, client 202 can receive a response from message management service 200, e.g., indicating success or failure of the action. At block 520, client 202 can act on the response. For example, depending on the action requested and the response, client 202 can update its window 240, generate feedback to the user, and so on.

If, however, at block 504, client 202 has lost communication with message management service 200, then at block 512, client 202 can queue the action request, including the synchronization data bundle, for later delivery to message management service 200. At block 524, client 202 can perform the action locally. For instance, client 202 can update message metadata in client window 240 to reflect the action, which can result in modifications appearing in the user interface of the client app. However, in order to preserve the ability to re-synchronize with server window 242, in some embodiments, messages are not deleted or removed from client window 240 while client 202 is offline. Examples of processes for delivering queued action requests are described below.

After the action is performed or queued, process 500 can reach block 526 and await a next action. For example, if additional messages are received from message management service 200, process 500 can return to block 502 to update window 240. If another user input is received, process 500 can return to block 512 to process the input. In some embodiments, once client 202 has gone offline at block 514, all subsequent action requests are queued (block 522), so that they can be processed in order after client 202 reconnects to message management service 200.

It will be appreciated that process 500 is illustrative and that variations and modifications are possible. Steps described as sequential may be executed in parallel, order of steps may be varied, and steps may be modified, combined, added or omitted. For instance, as shown in FIG. 5, a client device can send the synchronization data bundle for a message along with any request to act on the message. In some embodiments, the synchronization data bundle is sent with every action request. In other embodiments, the synchronization data bundle is sent with an action request only if an event has occurred at the client device indicating that synchronization with the message management service might have been lost, for example, if the client device has lost network connectivity, even for a brief period. In instances where no event indicating potential loss of synchronization has occurred, the client can send an abbreviated action request including less information (e.g., just including an indicator of the message's position within window 240).

Figure 6:
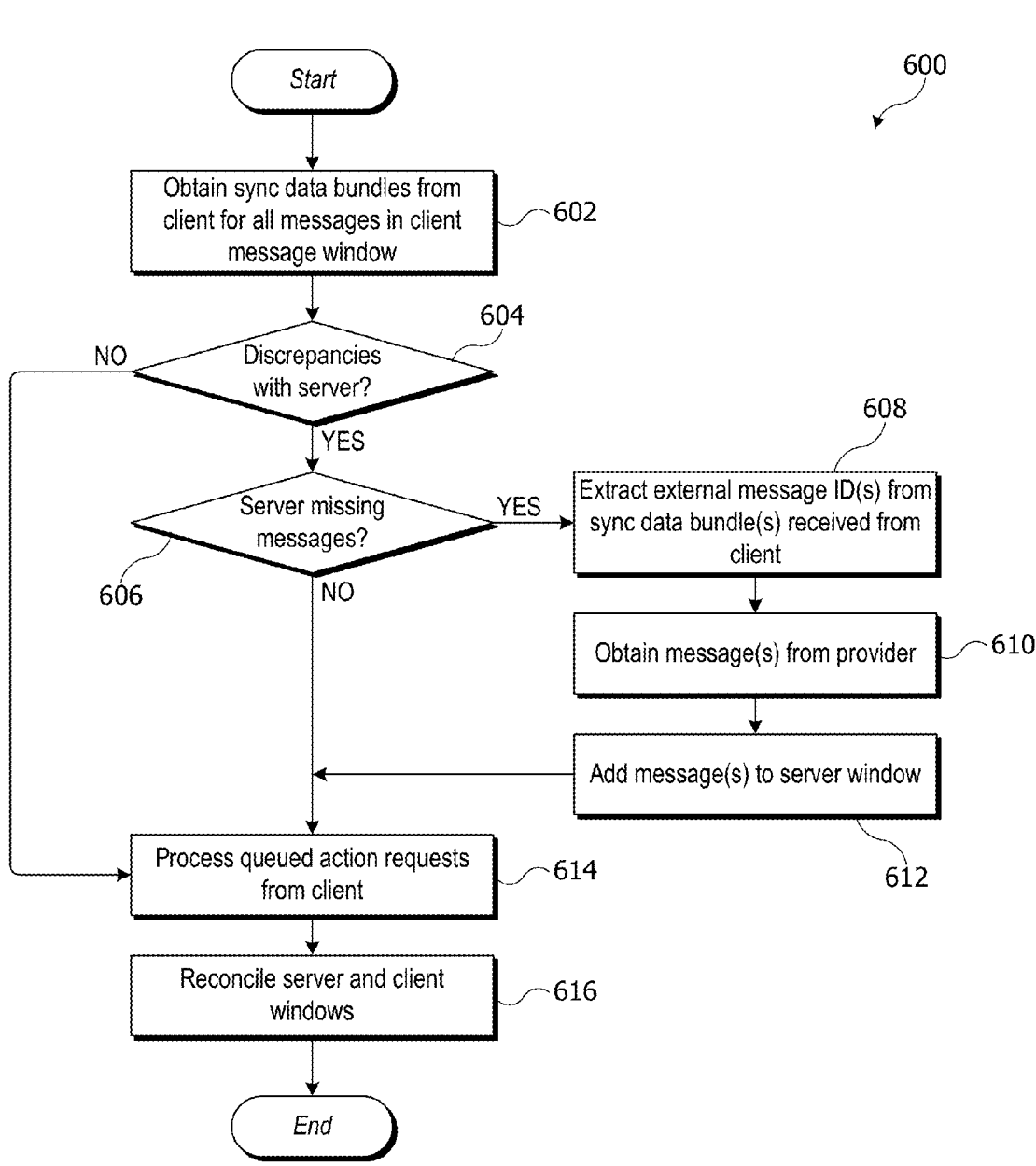
FIG. 6 shows a flow diagram of a process for synchronizing a message management service with a client device according to an embodiment of the present invention.

When a client (e.g., client 202) comes back online after going offline, it can be useful to resynchronize server message window 242 and client message window 240. FIG. 6 shows a flow diagram of a process 600 for synchronizing with a client, e.g., client 202 of FIG. 2, according to an embodiment of the present invention. Process 600 can be performed by a message management service, e.g., service 200 of FIG. 2.

Process 600 can begin when message management service 200 detects that a client (e.g., client 202) has come back online after being offline. At this stage, process 600 can assume that discrepancies may exist between the current state of server message window 242 maintained for client 202 and the current state of client message window 240.

At block 602, process 600 can obtain the synchronization data bundle for each message in client message window 240. For example, when client interface 210 of message management service 200 (FIG. 2) detects that client 202 has reconnected after disconnecting, client interface 210 can send a request for all synchronization data bundles to client 202, and client 202 can respond by sending the synchronization data bundle for each message in client message window 240.

At block 604, process 600 can determine whether there are any discrepancies between the messages in client window 240 and the messages in server window 242. For example, client interface 210 can provide the synchronization data bundles received from client 202 to synchronization manager 236. Synchronization manager 236 can use the synchronization data bundles (or specific information items contained therein) to determine whether there are any messages in client window 240 that are not in server window 242 and/or whether there are any messages in server window 242 that are not in client window 240.

At block 606, if there are any messages in client window 240 that are not in server window 242, process 600 can restore the "missing" messages to server window 242. For example, at block 608, process 600 can extract the external message ID for each missing message from the synchronization data bundle provided by the client. At block 610, process 600 can use the external message ID(s) to retrieve the missing message(s) from the messaging service (e.g., messaging service 204a). At block 612, process 600 can add the retrieved message(s) to server window 242.

Once message management service 200 has updated server window 240 to contain copies of all messages in client window 242, process 600 can process any queued action requests from client 202 at block 614. For instance, as described above with reference to FIG. 5, client 202 can begin to queue action requests once it goes offline, and in some embodiments, block 614 can include receiving the queued action requests from client 202 and processing each request. The action requests can be queued and processed in the order in which they were generated, or out of order as desired; various conflict resolution techniques can be employed. Depending on the particulars of a given action request, processing of the action request can include updating server window 242, sending instructions to messaging service 204a to modify the message or its metadata, sending an outbound message composed by the user to messaging service 204a for delivery to a recipient, and so on. Any type of action processing can be implemented, within message management service 200 or cooperatively with messaging service 204a. In some embodiments, processing queued action requests at block 614 can include sending confirmations or other responses to client 202.

At block 616, after the queued action requests have been processed, process 600 can complete the reconciliation of server message window 242 and client message window 240. For example, as shown above in FIG. 3D, server message window 242 can temporarily be made larger than its nominal maximum size, to facilitate synchronization in instances where messages have been added to server window 242 but not propagated to client window 240. Such a discrepancy can be detected, e.g., at block 604 of process 600, and reconciliation at block 616 can include sending messages to client 202 to be added to client window 240. As in other instances where message management service 200 adds messages to client window 240, a corresponding synchronization data bundle can be sent to client 202 together with each message to be added. In some instances, reconciliation at block 614 can also include determining that certain messages should be removed from server window 242 and/or client window 240 (e.g., to restore the windows to their nominal maximum size). For each message to be removed from server window 242, message management service 200 can simply delete the message; for messages to be removed from client window 240, message management service 200 can send a removal instruction to client 202.

After the client and server windows have been reconciled, process 600 can end (block 616). Interoperation of message management service 200 and client 202 can continue.

Figure 7:
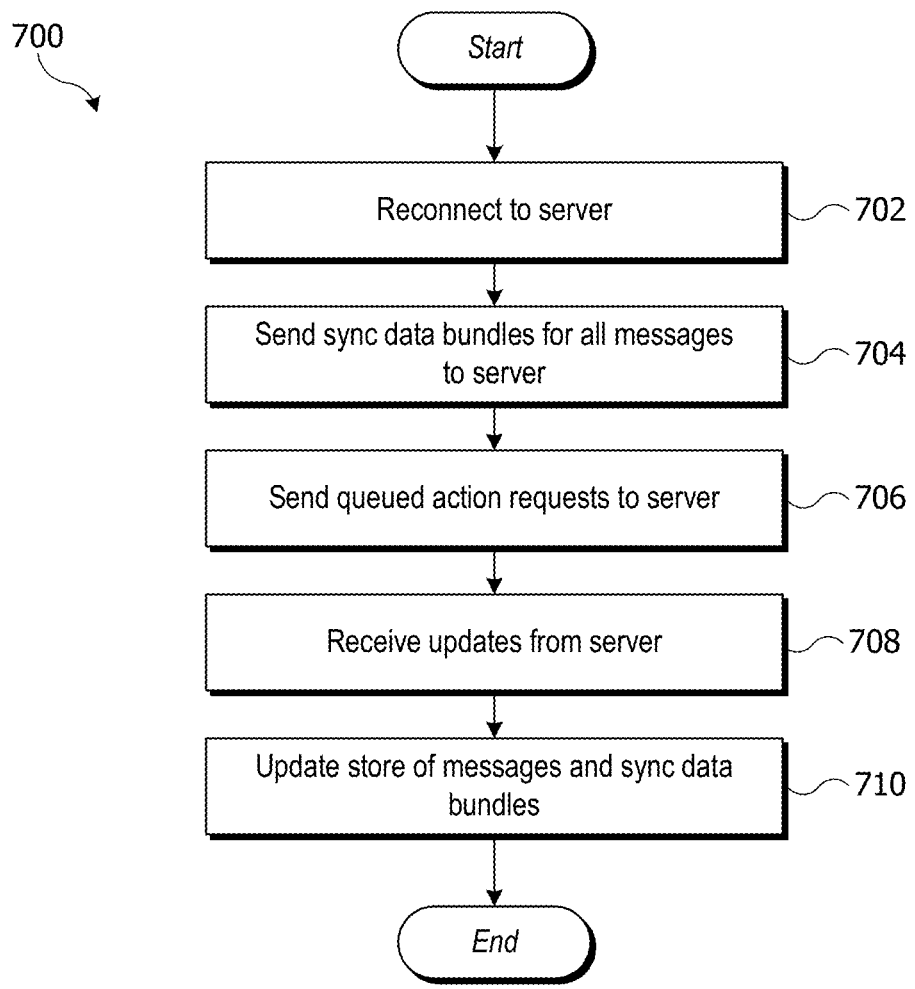
FIG. 7 shows a flow diagram of a synchronization process for synchronizing a client device with a message management service according to an embodiment of the present invention.

FIG. 7 shows a flow diagram of a synchronization process 700 according to an embodiment of the present invention. Process 700 can be implemented in a client device (e.g., client 202) that interacts with a message management service (e.g., message management service 200) implementing process 600 of FIG. 6 or similar processes. In particular, as described above, client 202 can maintain client window 240 of messages received from message management service 200, and the stored information in window 240 can include a synchronization data bundle for each message in window 240.

Process 700 can begin at block 702, when client 202 reconnects to message management service 200 after a period of being offline. (The duration of the period of being offline is not relevant for present purposes.) At block 704, process 700 can send the synchronization data bundle for each message in client window 240 to message management service 200. As described above, in some embodiments, message management service 200 can request the synchronization data bundles, and sending synchronization data bundles at block 704 can occur in response to such a request. In other embodiments, client 202 can send the synchronization data bundles at block 704 without receiving a specific request, e.g., upon reconnecting after going offline. At block 706, client 202 can send its queued action requests (e.g., requests queued at block 522 of process 500 of FIG. 5) to message management service 200. Message management service 200 can process the action requests, e.g., at block 614 of process 600 described above. In some embodiments, client 202 can receive confirmations or other responses as action requests are processed by message management service 200.

At block 708, process 700 can receive window updates from message management service 200. These updates can be generated, e.g., in connection with block 616 of process 600 described above. Depending on circumstances, the updates can include instructions to add a message to client window 240, to remove a message from client window 240, and/or to update status or other metadata related to a message in client window 240. In instances where the update includes an instruction to add a message to client window 240, the synchronization data bundle for the message to be added can be received with the instruction. At block 710, client 202 can perform the updates to client window 240. Thereafter process 700 can end.

Synchronization processes 600 and 700 can be complementary processes performed by a message management service and a client. Upon completion of processes 600 and 700, server message window 242 and client message window 240 are expected to be in a synchronized state, where the same set of messages is represented in both windows.

In some embodiments, neither message management service 200 nor client 202 is required to preserve synchronization data bundles for messages that were removed from their respective windows 242, 240 during synchronization. As long as client 202 maintains the synchronization data bundle for each message currently stored in client window 240, synchronization with server window 242 can be restored.

It will be appreciated that processes 600 and 700 are illustrative and that variations and modifications are possible. Steps described as sequential may be executed in parallel, order of steps may be varied, and steps may be modified, combined, added or omitted. For instance, a message management service can execute both processes 400 and 600 (or portions thereof) at various times, and a synchronization process such as process 600 can be invoked at any point at which the message management service determines that re-synchronizing with a particular client would be useful. Similarly, a client device can execute both processes 500 and 700 (or portions thereof) at various times, and synchronization can be performed regardless of whether a disconnection or reconnection event occurred or was detected by either device.

Using processes described herein, a message management service (e.g., message management service 104 of FIG. 1 or message management service 200 of FIG. 2) can restore synchronization with a client device (e.g., client 108 of FIG. 1 or client 202 of FIG. 2) at any time, without the need to store synchronization data locally at the message management service. Instead, the task of storing synchronization data can be offloaded or distributed to the client devices, each of which can store a synchronization data bundle for each message currently in its own window (or cache or local store) of messages. The client can provide the synchronization data bundle back to the message management service in order to facilitate partial or complete resynchronization between the server's and client's message windows. For instance, as described above the client can include the synchronization data bundle in a request to act on or update a particular message, or the client can provide the synchronization data bundles for all messages in its window as part of a synchronization operation. As a result, the message management service can have access to the information it needs to synchronize its own message window (or cache or local store) with the client's message window, without having to maintain a persistent store of such information. This distributed storage of synchronization data can reduce the data storage requirements for the message management service while adding only a small incremental storage requirement to each client device.

The foregoing description focuses on interactions between a message management service and a single client device. It is contemplated that a message management service can interact concurrently with a large number of client devices (e.g., hundreds, thousands, or millions), including devices belonging to or otherwise associated with different users or messaging accounts, and can maintain a separate server message window for each client device.

In some embodiments, multiple client devices that communicate with the same message management service can be associated with the same user or the same messaging-service account (or accounts). For instance, the user might have both a mobile phone and a tablet computer capable of interacting with the same message management service to manage the same messaging-service account or accounts. Where multiple client devices are associated with the same user (or set of accounts), the message management service can maintain a separate message window for each client device. To the extent the same rules are applied with each client device, the server windows for different client devices associated with the same user account(s) can end up including the same set of messages at a given time, although this is not required. Alternatively, the message management service can maintain a single server window for each user (or account) and can synchronize different client devices belonging to the same user with the same server window.

In various embodiments, the message management service can manage messages from one or more messaging-service accounts for a given user (which can include accounts with the same messaging service and/or accounts with different messaging services), and all of the user's messaging-service accounts can be linked to a single account on the message management service. Where more than one messaging-service account is managed for a user, the user's client device can provide separate user interfaces for different messaging-service accounts or a single user interface that incorporates messages from all of the messaging-service accounts, depending on implementation. In either case, the synchronization data bundle for a given message can include information identifying the particular messaging-service account and/or messaging service from which the message in question was received, and this information can be used by the message management service when requesting messages from a messaging service, e.g., during synchronization operations as described above.

The particular structure and/or content of a synchronization data bundle can be varied as desired, and multiple formats and structures can co-exist in the same system. For instance, as noted above, different messaging services may adopt different conventions and formats for message identifiers. Such differences can be reflected in the content or format of synchronization data bundles corresponding to messages from different messaging services, with the external message ID in a given instance conforming to the appropriate convention and format for the messaging service that provided the message. Synchronization data bundles for different messages can incorporate different information items, including external message identifiers having different formats and/or lengths, provided that message management service is capable of extracting the external message identifier and/or other information items from a synchronization data bundle received from a client. The client can be agnostic to the content of the synchronization data bundle. As described above, the client can simply store the bundle as received and return it, unmodified, to the message management service at a later time.

In some embodiments, a synchronization data bundle can include other information in addition to external and/or internal message identifiers. For example, a message can have associated status metadata items that can change as the message is acted upon. Examples of status metadata items can include, e.g., an indicator as to whether the message is read or unread; an indicator that the recipient user has responded the message (e.g., replying to or forwarding the message); an identifier of a folder in which the message is located; any flags (e.g., follow-up flags), tags, or other indicia that have been applied to the message by the user, the messaging service, or the message management service; and so on.

A user can interact with a message while the client is online, and such interaction can result in updating the status metadata for the message in the client message window. For instance, referring to FIG. 2, status metadata in client window 240 may indicate a particular message is marked as read if the user reads the message while client 202 was offline. Consequently, client window 240 and server window 242 can have inconsistent status metadata. If a representation of the current status metadata for a particular message is included in the synchronization data bundle sent to client 202 with the message, message management service 200 can subsequently use the synchronization data bundle to reconstruct a past state of its window. This can be useful in connection with processing action requests received from the client (e.g., at block 614 of process 600 of FIG. 6).

In embodiments where the synchronization data bundle includes status information that may have changed, reconciliation at block 616 can include generating updated synchronization data bundles for some or all of the messages in client window 240, even if the message is neither added nor removed during the synchronization operation. Additionally or instead, message metadata (including status metadata items as described above) that is stored separately from the synchronization data bundle can be updated as appropriate.

Figure 8:
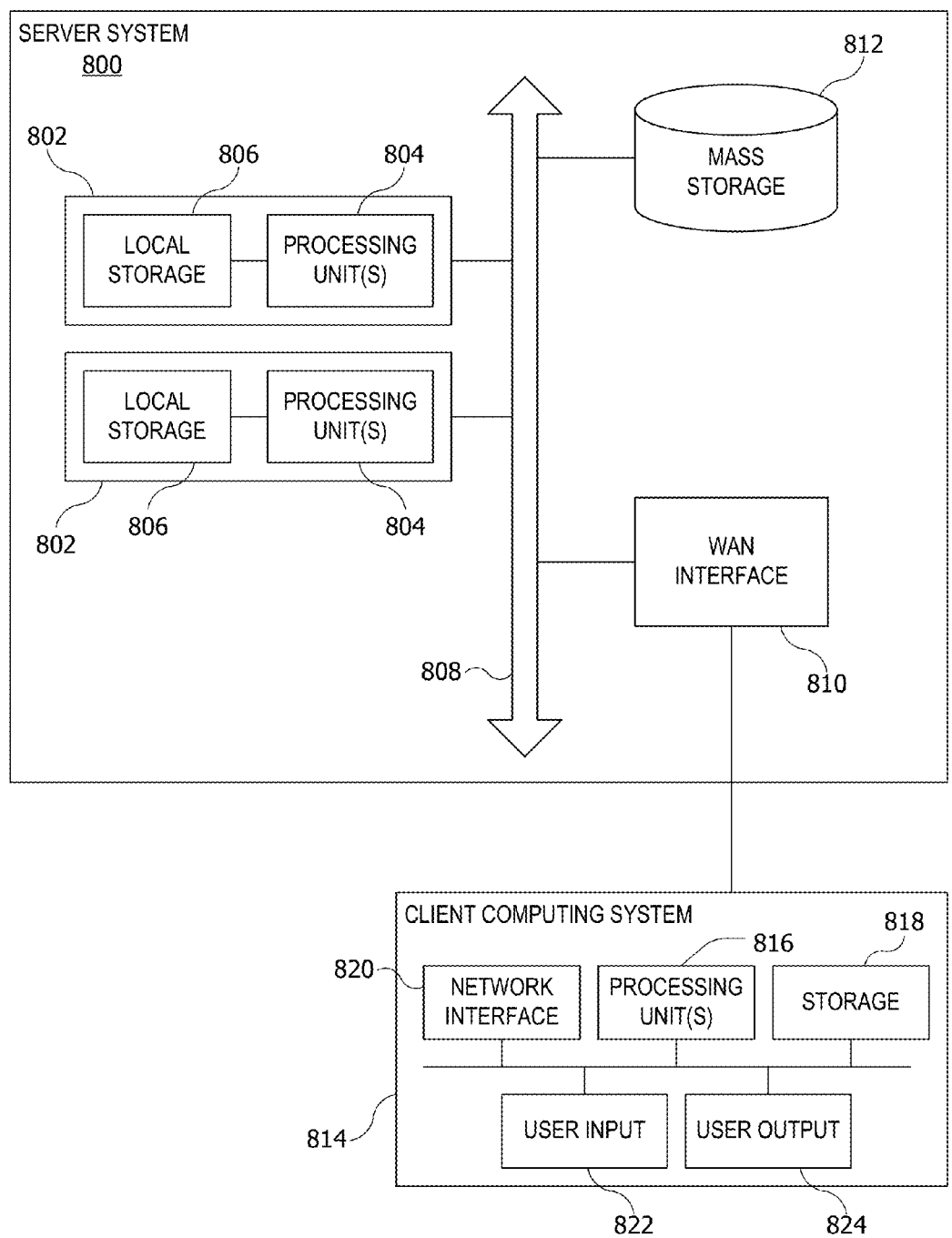
FIG. 8 shows a simplified block diagram of a representative server system and client computer system usable to implement certain embodiments of the present invention.

Various operations described herein can be implemented on computer systems, which can be of generally conventional design. FIG. 8 shows a simplified block diagram of a representative server system 800 and client computer system 814 usable to implement certain embodiments of the present invention. In various embodiments, server system 800 or similar systems can implement message management service 200, messaging services 204, or any other services or servers described herein or portions thereof. Client computer system 814 or similar systems can implement client device 202 or other clients described herein.

Server system 800 can have a modular design that incorporates a number of modules 802 (e.g., blades in a blade server implementation); while two modules 802 are shown, any number can be provided. Each module 802 can include processing unit(s) 804 and local storage 806.

Processing unit(s) 804 can include a single processor, which can have one or more cores, or multiple processors. In some embodiments, processing unit(s) 804 can include a general-purpose primary processor as well as one or more special-purpose co-processors such as graphics processors, digital signal processors, or the like. In some embodiments, some or all processing units 804 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 804 can execute instructions stored in local storage 806. Any type of processors in any combination can be included in processing unit(s) 804.

Local storage 806 can include volatile storage media (e.g., conventional DRAM, SRAM, SDRAM, or the like) and/or non-volatile storage media (e.g., magnetic or optical disk, flash memory, or the like). Storage media incorporated in local storage 806 can be fixed, removable or upgradeable as desired. Local storage 806 can be physically or logically divided into various subunits such as a system memory, a read-only memory (ROM), and a permanent storage device. The system memory can be a read-and-write memory device or a volatile read-and-write memory, such as dynamic random access memory. The system memory can store some or all of the instructions and data that processing unit(s) 804 need at runtime. The ROM can store static data and instructions that are needed by processing unit(s) 804. The permanent storage device can be a non-volatile read-and-write memory device that can store instructions and data even when module 802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 806 can store one or more software programs to be executed by processing unit(s) 804, such as an operating system and/or programs implementing various server functions such as functions of message management modules 212, messaging service interface 214, and/or client interface 210 of FIG. 2, or any other server(s) associated with messaging system 100 of FIG. 1. "Software" refers generally to sequences of instructions that, when executed by processing unit(s) 804 cause server system 800 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 804. Software can be implemented as a single program or a collection of separate programs or program modules that interact as desired. From local storage 806 (or non-local storage described below), processing unit(s) 804 can retrieve program instructions to execute and data to process in order to execute various operations described herein.

In some server systems 800, multiple modules 802 can be interconnected via a bus or other interconnect 808, forming a local area network that supports communication between modules 802 and other components of server system 800. Interconnect 808 can be implemented using various technologies including server racks, hubs, routers, etc.

A wide area network (WAN) interface 810 can provide data communication capability between the local area network (interconnect 808) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 806 is intended to provide working memory for processing unit(s) 804, providing fast access to programs and/or data to be processed while reducing traffic on interconnect 808. Storage for larger quantities of data can be provided on the local area network by one or more mass storage subsystems 812 that can be connected to interconnect 808. Mass storage subsystem 812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 812. In some embodiments, additional data storage resources may be accessible via WAN interface 810 (potentially with increased latency).

Server system 800 can operate in response to requests received via WAN interface 810. For example, one of modules 802 can implement a supervisory function and assign discrete tasks to other modules 802 in response to received requests. Conventional work allocation techniques can be used. As requests are processed, results can be returned to the requester via WAN interface 810. Such operation can generally be automated. Further, in some embodiments, WAN interface 810 can connect multiple server systems 800 to each other, providing scalable systems capable of managing high volumes of activity. Conventional or other techniques for managing server systems and server farms (collections of server systems that cooperate) can be used, including dynamic resource allocation and reallocation.

Server system 800 can interact with various user-owned or user-operated devices via a wide-area network such as the Internet. An example of a user-operated device is shown in FIG. 8 as client computing system 814. Client computing system 814 can be implemented, for example, as a consumer device such as a smart phone, other mobile phone, tablet computer, wearable computing device (e.g., smart watch, eyeglasses), desktop computer, laptop computer, and so on.

For example, client computing system 814 can communicate via WAN interface 310. Client computing system 814 can include conventional computer components such as processing unit(s) 816, storage device 818, network interface 820, user input device 822, and user output device 824. Client computing system 814 can be a computing device implemented in a variety of form factors, such as a desktop computer, laptop computer, tablet computer, smart phone, other mobile computing device, wearable computing device, or the like.

Processor 816 and storage device 818 can be similar to processing unit(s) 804 and local storage 806 described above. Suitable devices can be selected based on the demands to be placed on client computing system 814; for example, client computing system 814 can be implemented as a "thin" client with limited processing capability or as a high-powered computing device. Client computing system 814 can be provisioned with program code executable by processing unit(s) 816 to enable various interactions with server system 800 of a message management service such as accessing messages, instructing the service to defer messages, and so on. Some client computing systems 814 can also interact with a messaging service independently of the message management service.

Network interface 820 can provide a connection to a wide area network (e.g., the Internet) to which WAN interface 810 of server system 800 is also connected. In various embodiments, network interface 820 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 822 can include any device (or devices) via which a user can provide signals to client computing system 814; client computing system 814 can interpret the signals as indicative of particular user requests or information. In various embodiments, user input device 822 can include any or all of a keyboard, touch pad, touch screen, mouse or other pointing device, scroll wheel, click wheel, dial, button, switch, keypad, microphone, and so on.

User output device 824 can include any device via which client computing system 814 can provide information to a user. For example, user output device 824 can include a display to display images generated by or delivered to client computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 824 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 804 and 816 can provide various functionality for server system 800 and client computing system 814, including any of the functionality described herein as being performed by a server or client, or other functionality associated with message management services.

It will be appreciated that server system 800 and client computing system 814 are illustrative and that variations and modifications are possible. Computer systems used in connection with embodiments of the present invention can have other capabilities not specifically described here. Further, while server system 800 and client computing system 814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. Particular data structures, message identifier formats, synchronization data bundle contents, and synchronization operations described herein can be varied. Embodiments of the invention can be realized using a variety of computer systems and communication technologies including but not limited to specific examples described herein.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
   receiving, by a server of a message management service, a plurality of messages from a message server of a messaging service, wherein each message of the plurality of messages comprises an external identifier set by the message server;
   selecting, by the server of the message management service, a set of messages from the plurality of messages based on one or more criteria, wherein the set of messages is less than a number of messages of the plurality of messages;
   generating, by the server of the message management service, an internal identifier for each message of the set of messages;
   storing, by the server of the message management service, the set of messages in a message management service window, the set of messages comprising at least a first message;
   generating, by the server of the message management service, a synchronization data bundle for each message in the message management service window, wherein the synchronization data bundle includes the internal identifier linked to a corresponding external identifier;
   identifying, by the server of the message management service, that a client device is online;
   receiving, from the client device, a set of queued action requests;
   defining, by the server of the message management service, a reconciled message window based at least in part on a current state of the message management service window, wherein a number of messages in the reconciled message window exceeds a nominal maximum size of the message management server window;
   updating, by the server of the message management service, the message management server window to correspond to the reconciled message window, such that the message management server window temporarily exceeds the nominal maximum size;
   sending, to the client device, an instruction to update the messages stored thereon to conform to the reconciled message window;
   upon identifying that the client device is online, synchronizing, by the server of the message management service, the set of messages in the message management service window with a client message window hosted on a client device remote from the server, by sending the set of the messages and the corresponding synchronization data bundle for each message in the set of messages to the client device;
   performing, by the server of the message management service, an update to the message management service window during a time when the client device is offline, wherein performing the update comprises removing the first message from the message management services window;
   receiving, by the server of the message management service, a first request from the client device to perform an action on the first message, the first request comprising the synchronization data bundle for the first message;
   determining, by the server of the message management service, that the first message has been removed from the message management services window based on the internal message identifier of the first message; and
   based on the determination, sending, by the server of the message management service to the message server, a second request to perform the action on the first message at the message server, the second request identifying the first message to the messaging service using the external message identifier.

2. The computer-implemented method of claim 1 further comprising:
   using, by the server, information from the synchronization data bundle to perform the requested action on the first message.

3. The computer-implemented method of claim 1 wherein the external message identifier is used to perform the requested action on the first message.

4. The computer-implemented method of claim 3 wherein using the information from the synchronization data bundle to perform the requested action on the first message includes:
   sending a message-retrieval request to the messaging service, the message-retrieval request including the external message identifier of the first message;
   receiving the first message from the messaging service in response to the message-retrieval request; and
   adding the first message to the message management service window.

5. The computer-implemented method of claim 3 wherein using the external message identifier from the synchronization data bundle to perform the requested action on the first message includes one or more of:
   sending a message-update request to the messaging service, the message-update request including the external message identifier and a message metadata item to be updated; or
   sending a message-delete request to the messaging service, the message-delete request including the external message identifier.

6. The computer-implemented method of claim 1 wherein performing the update includes:
   receiving, by the server of the message management service, a second message from the messaging service;
   adding, by the server, the second message to the message management service window; and removing the first message from the message management service window.

7. The computer-implemented method of claim 1 further comprising:

identifying, by the server, a second message that is present in the message management service window but not present on the client device; and sending to the client device, by the server of the message management service, the second message and a synchronization data bundle corresponding to the second message.

8. The computer-implemented method of claim 1 further comprising:

identifying, by the server of the message management service, a third message that is present on the client device but not present in the message management service window; and sending to the client device, by the server, an instruction to remove the third message.

9. A computer system comprising:

a message management service server having one or more processors and a memory, cause the computer system to:

receive a plurality of messages for a first client device from a messaging service running on a messaging server, wherein each message of the plurality of messages comprises an external identifier set by the message server;

select a set of messages from the plurality of messages based on one or more criteria, wherein the set of the messages is less than a number of messages of the plurality of messages;

store, by the message management service server, the set of messages in a server message window, the set of the messages comprising at least a first message;

generate a synchronization data bundle for each message in the message management service window, wherein the synchronization data bundle includes the internal identifier linked to a corresponding external identifier;

identify that a client device is online;

receive, from the client device, a set of queued action requests;

define a reconciled message window based at least in part on a current state of the message management service window, wherein a number of messages in the reconciled message window exceeds a nominal maximum size of the message management server window;

update the message management server window to correspond to the reconciled message window, such that the message management server window temporarily exceeds the nominal maximum size;

send, to the client device, an instruction to update the messages stored thereon to conform to the reconciled message window;

upon identifying that the client device is online, synchronize the set of messages in the server message window with a client message window hosted on a client device remote from the server, by sending the set of messages and the corresponding synchronization data bundle for each message in the set of messages to the client device;

receive a request from the first client device to perform an action on the first message, the request including the synchronization data bundle for the first message;

in the event that the first message is present in the server message window stored for the client device, use information stored server message window to perform the requested action on the first message; and in the event that the message is absent from the server message window stored for the client device, use information from the synchronization data bundle to perform the requested action on the first message, including sending information from the synchronization data bundle to the messaging service at the messaging server.

10. The computer system of claim 9 wherein the instructions cause the computer system to create a synchronization data bundle corresponding to a given message.

11. The computer system of claim 10 wherein the synchronization data bundle further includes a status metadata item indicating a status of the first message when the synchronization data bundle was created.

12. The computer system of claim 9 wherein the instructions cause the computer system to extract one or more information items from a synchronization data bundle received from the client device.

13. The computer system of claim 9 wherein the synchronization data bundle further includes a thread identifier assigned to the first message by the messaging service.

14. A non-transitory computer-readable storage medium having stored thereon program code instructions that, when executed by a server computer system, cause the server computer system to perform a method comprising:

receiving, by a server of a message management service, a plurality of messages from a message server of a messaging service, wherein each message of the plurality of messages comprises an external identifier set by the message server;

selecting, by the server of the message management service, a set of messages from the plurality of messages based on one or more criteria, wherein the set of messages is less than a number of messages of the plurality of messages;

storing, by the server of the message management service server, the set of messages in a message management service window, the set of messages comprising at least a first message;

obtaining, from a client device, a set of synchronization data bundles, each synchronization data bundle in the set of synchronization data bundles corresponding to a different one of a plurality of messages stored by the client device, and where each synchronization data bundle includes an internal message identifier generated by the server of the message management service for the corresponding message and the external message identifier for the corresponding message;

determining, based at least in part on the synchronization data bundles, whether one or more of the plurality of messages stored by the client device is absent from a message management service window; and for each one of the plurality of messages stored by the client device that is absent from the message management service window:

extracting, from the synchronization data bundle corresponding to the message that is absent from the message management server window, the external message identifier assigned to the message by a messaging service;

using the external message identifier to retrieve the message from the messaging service;

adding the retrieved message to the message management service window;

receiving, from the client device, a set of queued action requests;

defining a reconciled message window based at least in part on a current state of the message management service window, wherein a number of messages in the reconciled message window exceeds a nominal maximum size of the message management server window;

updating the message management server window to correspond to the reconciled message window, such that the message management server window temporarily exceeds the nominal maximum size; and sending, to the client device, an instruction to update the messages stored thereon to conform to the reconciled message window.

15. The non-transitory computer-readable storage medium of claim 14 wherein the method further comprises:
processing each of the queued action requests.

16. The non-transitory computer-readable storage medium of claim 15 wherein the method further comprises:
subsequently to processing the queued action requests, defining a reconciled message window based at least in part on a current state of the message management service window;

updating the message management service window to correspond to the reconciled message window; and sending, to the client device, an instruction to update the messages stored thereon to conform to the reconciled message window.

17. The non-transitory computer-readable storage medium of claim 15 wherein the method further comprises:
subsequently to processing the queued action requests, determining whether the message management service window includes any messages for which the client device did not send a corresponding synchronization data bundle; and for each message in the message management service window for which the client device did not send a corresponding synchronization data bundle:

generating a synchronization data bundle corresponding to the message; and sending the message and the synchronization data bundle to the client device.

18. The non-transitory computer-readable storage medium of claim 14 wherein the method further includes:
receiving an inbound message from the messaging service to be sent to the client device;

generating a synchronization data bundle corresponding to the inbound message; and sending the inbound message and the corresponding synchronization data bundle to the client device.

* * * * *